United States Patent
Namba et al.

(10) Patent No.: US 10,786,707 B2
(45) Date of Patent: Sep. 29, 2020

(54) GOLF BALL

(71) Applicant: Bridgestone Sports Co., Ltd., Tokyo (JP)

(72) Inventors: Atsushi Namba, Chichibushi (JP); Hirotaka Shinohara, Chichibushi (JP); Kae Iizuka, Chichibushi (JP)

(73) Assignee: Bridgestone Sports Co., Ltd., Minato-ku, Tokyo (JP)

( * ) Notice: Subject to any disclaimer, the term of this patent is extended or adjusted under 35 U.S.C. 154(b) by 0 days.

(21) Appl. No.: 16/393,446

(22) Filed: Apr. 24, 2019

(65) Prior Publication Data

US 2019/0388734 A1 Dec. 26, 2019

(30) Foreign Application Priority Data

Jun. 22, 2018 (JP) ................................. 2018-118518

(51) Int. Cl.
*A63B 37/00* (2006.01)
*A63B 37/12* (2006.01)
*A63B 37/14* (2006.01)

(52) U.S. Cl.
CPC ...... *A63B 37/0022* (2013.01); *A63B 37/0024* (2013.01); *A63B 37/0075* (2013.01); *A63B 37/0076* (2013.01)

(58) Field of Classification Search
CPC ............ A63B 37/0022; A63B 37/0024; A63B 37/0023; A63B 37/12
See application file for complete search history.

(56) References Cited

U.S. PATENT DOCUMENTS

| 8,864,605 | B2 | 10/2014 | Iizuka et al. | |
|---|---|---|---|---|
| 2004/0178534 | A1* | 9/2004 | Puniello | A63B 37/0004 264/246 |
| 2007/0135234 | A1* | 6/2007 | Nagasawa | A63B 37/0012 473/353 |
| 2008/0248898 | A1* | 10/2008 | Morgan | A63B 37/0003 473/373 |
| 2012/0035002 | A1* | 2/2012 | Iizuka | A63B 37/0022 473/385 |
| 2012/0329577 | A1* | 12/2012 | Anderl | A63B 37/0022 473/378 |
| 2013/0085016 | A1* | 4/2013 | Nakamura | A63B 37/0022 473/378 |
| 2016/0175663 | A1* | 6/2016 | Tago | A63B 37/005 473/373 |
| 2016/0177120 | A1* | 6/2016 | Nanba | C08K 5/098 252/301.35 |
| 2018/0093137 | A1* | 4/2018 | Park | C09D 7/69 |
| 2018/0207490 | A1* | 7/2018 | Hong | A63B 37/0022 |

FOREIGN PATENT DOCUMENTS

| JP | 2012-034776 A | 2/2012 |
|---|---|---|
| JP | 2012-105725 A | 6/2012 |

* cited by examiner

*Primary Examiner* — John E Simms, Jr.
(74) *Attorney, Agent, or Firm* — Sughrue Mion, PLLC

(57) ABSTRACT

A matte golf ball which is free of luster and gloss has such a good ball appearance that the injection marks which form during injection molding of the cover are not visible. The golf ball includes a core of at least one layer, a cover of at least one layer, and a paint film. The outermost layer of the cover is formed of a resin composition which includes a thermoplastic resin and a colorant comprising a fluorescent dye or a fluorescent pigment, and has a visible light transmittance with an average value at wavelengths in the 380 to 780 nm spectrum of from 2.0 to 50.0%. The paint film is formed of a urethane-based paint composition containing delustering particles.

6 Claims, No Drawings

GOLF BALL

CROSS-REFERENCE TO RELATED APPLICATION

This non-provisional application claims priority under 35 U.S.C. § 119(a) on Patent Application No. 2018-118518 filed in Japan on Jun. 22, 2018, the entire contents of which are hereby incorporated by reference.

TECHNICAL FIELD

The present invention relates to a matte, gloss-free golf ball having a core of at least one layer and a cover of at least one layer.

BACKGROUND ART

The dimples formed on the surface of a golf ball are an important constituent element that increases the aerodynamic performance in the flight of the ball, and can also be a factor determining the aesthetic appearance and decorativeness of the ball. In colored golf balls in particular, the impression given by the ball appearance is collectively determined by a combination of, for example, the shapes of the dimples, the color of the ball and effect pigments. Many colored balls include fluorescent colorants and the like in the cover layer (outermost layer). There also exist golf balls having a paint film obtained by including an effect pigment such as a polarizing pigment in the paint resin of, for example, a urethane paint.

Art relating to colored golf balls having a bright, diaphanous hue includes that disclosed in JP-A 2012-105725 and JP-A 2012-34776. Yet, although these golf balls are colored golf balls having a bright, diaphanous hue, such a ball appearance is readily subject to dimple-shaped shadows and light-reflecting effects, which adversely affects play.

In addition, so-called matte golf balls which have an appearance that is colored but are delustered or free of gloss to such a degree that dimple contours on the surface of the ball cannot be discerned have been popular recently.

However, conventional matte golf balls, primarily in the paint film resin material, include a delusterant such as silica in the paint resin of, for example, a urethane paint. Such golf balls have a matte appearance that looks as if there are no dimples, but injection marks such as gate marks that form during injection molding of the cover (outermost layer) can be seen through the paint film. No consideration is given in such art to the formulation and light transmittance of the cover stock.

SUMMARY OF THE INVENTION

It is therefore an object of the present invention to provide a matte golf ball which is free of luster and gloss and which has such a good ball appearance that the injection marks which form during injection molding of the cover are not visible.

As a result of extensive investigations, we have discovered that, in a golf ball having a core of at least one layer and a cover of at least one layer, by forming the outermost layer of the cover of a resin composition that includes (A) a thermoplastic resin and (B) a colorant comprising a fluorescent dye or a fluorescent pigment, setting the visible light transmittance of the outermost layer within the light wavelength spectrum of 380 to 780 nm in the range of 2.0 to 50.0%, and forming a paint film with a urethane-based paint composition containing delustering particles, there can be obtained a golf ball which has such a good ball appearance that the injection marks which form during injection molding of the cover are not visible.

Accordingly, in a first aspect, the invention provides a golf ball having a core of at least one layer, a cover of at least one layer and a paint film, wherein the outermost layer of the cover is formed of a resin composition containing (A) a thermoplastic resin and (B) a colorant comprising a fluorescent dye or a fluorescent pigment, and has a visible light transmittance with an average value at wavelengths in the 380 to 780 nm spectrum of 2.0 to 50.0%. The paint film is formed of a urethane-based paint composition containing delustering particles.

In a preferred embodiment of the golf ball of the invention, the thermoplastic resin of component (A) includes either of the following components (a) and (b):

(a) an ethylene-α,β-unsaturated carboxylic acid copolymer and/or a metal salt thereof, (b) an ethylene-α,β-unsaturated carboxylic acid-α,β-unsaturated carboxylic acid ester copolymer and/or a metal salt thereof.

In another preferred embodiment, the content of component (B) is from 0.001 to 0.2 part by weight per 100 parts by weight of component (A).

In yet another preferred embodiment, the resin composition of the outermost layer further includes (C) an inorganic filler or organic filler in an amount of from 0.01 to 1.0 part by weight per 100 parts by weight of component (A).

In a further preferred embodiment, the outermost layer has a transmittance of from 4 to 45%.

In a still further preferred embodiment, the outermost layer has a transmittance of from 10 to 40%.

In a yet further preferred embodiment, the delustering particles in the paint film-forming urethane-based paint composition are silica.

In an additional preferred embodiment, the silica serving as the delustering particles has an average primary particle size of from 1.0 to 3.0 μm and a BET specific surface area of from 200 to 400 $m^2/g$.

ADVANTAGEOUS EFFECTS OF THE INVENTION

In the golf ball of the invention, by combining a cover material that includes a light-harvesting fluorescent dye with an inorganic filler-containing delustering paint, an illusory effect is imparted whereby a golf ball which has dimples appears to be free of dimples and injection marks that form during injection molding of the cover can be concealed, giving the ball a good appearance.

DESCRIPTION OF THE PREFERRED EMBODIMENTS

The objects, features and advantages of the invention will become more apparent from the following detailed description.

The golf ball of the invention has a core of at least one layer, a cover of at least one layer, and a paint film. The cover used in the invention is a member that encases the core and may have a plurality of layers. Examples of such covers include two-layer covers and three-layer covers. Each layer of the cover is called a cover layer, although the inner side of the cover is sometimes referred to as the intermediate layer and the outer side is sometimes referred to as the outermost layer. In the case of a three-layer cover, the respective layers are sometimes called, in order from the inner side: the envelope layer, the intermediate layer and the outermost layer.

In the present invention, the outermost layer of the cover is formed of a resin composition that includes (A) and (B) below:

(A) a thermoplastic resin, and (B) a colorant comprising a fluorescent dye or a fluorescent pigment. Components (A) and (B) are described below.

(A) Thermoplastic Resin

Exemplary thermoplastic resins include, without particular limitation, resins that have hitherto been used as golf ball materials, such as ionomeric resins, polyester resins, polyurethane resins, polyamide resins, polyolefin resins, olefin-based thermoplastic elastomers and styrene-based thermoplastic elastomers. Ionomeric resins are especially suitable and preferably include, for example, either of (a) and (b) below: (a) an ethylene-$\alpha,\beta$-unsaturated carboxylic acid copolymer and/or a metal salt thereof, (b) an ethylene-$\alpha,\beta$-unsaturated carboxylic acid-$\alpha,\beta$-unsaturated carboxylic acid ester copolymer and/or a metal salt thereof.

Specific examples of the $\alpha,\beta$-unsaturated carboxylic acid in components (a) and (b) include acrylic acid, methacrylic acid, maleic acid and fumaric acid. Acrylic acid and methacrylic acid are especially preferred. The $\alpha,\beta$-unsaturated carboxylic acid ester in component (b) is preferably a lower alkyl ester of the above unsaturated carboxylic acid, specific examples of which include methyl methacrylate, ethyl methacrylate, propyl methacrylate, butyl methacrylate, methyl acrylate, ethyl acrylate, propyl acrylate and butyl acrylate. Butyl acrylate (butyl n-acrylate, butyl i-acrylate) is especially preferred. Metal ion neutralization products of the copolymers in components (a) and (b) can be obtained by partially neutralizing acid groups on the olefin-unsaturated carboxylic acid copolymer or the olefin-unsaturated carboxylic acid-unsaturated carboxylic acid ester copolymer with metal ions. Illustrative examples of metal ions which neutralize the acid groups include $Na^+$, $K^+$, $Li^+$, $Zn^{++}$, $Cu^{++}$, $Mg^{++}$, $Ca^{++}$, $Co^{++}$, $Ni^{++}$ and $Pb^{++}$. Preferred use can be made of $Na^+$, $Li^+$, $Zn^{++}$, $Mg^{++}$ and $Ca^{++}$ in particular. Such neutralization products may be obtained by a known method. For example, a neutralization product may be obtained by using, for reaction with the above copolymer, a compound such as a formate, acetate, nitrate, carbonate, bicarbonate, oxide, hydroxide or alkoxide of the above metal ion.

Known substances may be used as components (a) and (b). Illustrative examples include commercial products such as the following acid copolymers: Nucrel® N1560, Nucrel® N1214, Nucrel® N1035, Nucrel® AN4221C, Nucrel® AN4311, Nucrel® AN 4318 and Nucrel® AN4319 (all products of DuPont-Mitsui Polychemicals Co., Ltd.). Illustrative examples of metal ion neutralization products of acid copolymers include Himilan® 1554, Himilan® 1557, Himilan® 1601, Himilan® 1605, Himilan® 1706, Himilan® AM7311, Himilan® 1855, Himilan® 1856 and Himilan® AM7316 (all products of DuPont-Mitsui Polychemicals Co., Ltd.), and Surlyn® 7930, Surlyn® 6320, Surlyn® 8320, Surlyn® 9320 and Surlyn® 8120 (E.I. DuPont de Nemours and Company).

The overall amount of thermoplastic resin serving as component (A) is not particularly limited, although it is recommended that the thermoplastic resin be included in an amount which is typically at least 70 wt %, preferably at least 80 wt %, and more preferably at least 90 wt %, of the total amount of the resin composition. When enough is not included, the desired effects of the invention may not be achievable.

(B) Colorant Comprising Fluorescent Dye or Fluorescent Pigment

This invention is directed at a colored ball whose surface is free of luster and soft-toned. A colorant comprising a fluorescent dye or fluorescent pigment is included for this purpose as component (B) in the outermost layer-forming resin material. Color is imparted to the outermost layer of the cover by suitably including a known fluorescent dye or fluorescent pigment as the colorant. Examples include solvent yellow, solvent orange, anthraquinone and phthalocyanine (all of which are dyes), and also yellow fluorescent pigments, pink fluorescent pigments and orange fluorescent pigments. Known commercial products may be used as these colorants.

In this invention, of the fluorescent colorants, the use of one that is light harvesting is preferred. Light-harvesting fluorescent colorants are materials which have the ability to collect sunlight and convert the wavelength to the long-wavelength side as fluorescent light. These materials are characterized in that they collect light by totally reflecting it at the interior of the colored material and guiding it to the dimple edges, where the light is emitted in a concentrated state and intensely colored.

Such light-harvesting fluorescent colorants include systems that generate orange, pink, red, yellow, blue or violet colors. Commercial products may be used in any of these chromogenic systems. Examples of light-harvesting fluorescent dyes that may be used include those available from BASF under the trade names Lumogen F Yellow 083, Lumogen F Orange 240, Lumogen F Red 305 and Lumogen F Blue 650, and those available from Kashinomoto Technologies Co., Ltd. under the trade names Lumicolor Red, Smart Color LP Green, Smart Color LP Yellow and Smart Color LP Orange.

The amount of component (B) included per 100 parts by weight of component (A) is from 0.001 to 0.2 part by weight, and preferably from 0.005 to 0.1 part by weight. When this amount is low, the fluorescence may weaken and the desired decorativeness may not be obtained. On the other hand, when this amount is high, migration of the colorants, especially dyes, may arise, staining objects that come into contact with the golf ball.

(C) Inorganic Filler or Organic Filler

In the practice of the invention, the resin composition of components (A) and (B) may further include an inorganic filler or an organic filler as component (C). The purpose of including this inorganic or organic filler is, as subsequently described, to suitably prepare the resin composition so that it has the desired transmittance in the visible light spectrum. However, component (C) is not an essential ingredient in this invention.

In cases where component (C) is an inorganic filler, illustrative examples include, without particular limitation, zinc oxide, barium sulfate, calcium carbonate, titanium dioxide and silica. Adding an inorganic filler makes it possible to impart translucency and to adjust the color.

In cases where component (C) is an organic filler, illustrative examples include, without particular limitation, fine particles of crosslinked polymethyl methacrylate (crosslinked PMMA), crosslinked polybutyl methacrylate, crosslinked polyacrylate ester, crosslinked acrylic-styrene copolymer, melamine resin or polyurethane.

The amount of component (C) added per 100 parts by weight of component (A) is from 0.01 to 1.0 part by weight, and preferably from 0.02 to 0.2 part by weight. When too much is added, the hiding properties may become excessive, detracting from the decorativeness of a stylish ball, or the change in color when color fading occurs due to sunlight exposure may increase.

The resin composition can be obtained by mixing together the above ingredients using, for example, any of various types of mixers, such as a kneading-type single-screw or twin-screw extruder, a Banbury mixer or a kneader.

Various additives may be optionally included in the resin composition. For example, pigments, dispersants, antioxidants, light stabilizers, ultraviolet absorbers and lubricants may be suitably added.

The individual layers of the cover, including the outermost layer, have thicknesses which, although not particularly limited, are preferably at least 0.5 mm, and more preferably at least 0.7 mm, but preferably not more than 1.7 mm, and more preferably not more than 1.4 mm.

The individual layers of the cover, including the outermost layer, have hardnesses on the Shore D scale which, although not particularly limited, are preferably at least 30, and more preferably at least 40, but preferably not more than 75, more preferably not more than 70, and even more preferably not more than 65.

The outermost layer has a visible light transmittance with an average value at wavelengths in the 380 to 780 nm spectrum of from 2.0 to 50.0%, preferably from 4 to 45%, and more preferably from 10 to 40%. The measured value for the visible light transmittance of the outermost layer specifically signifies the average of measurements taken using any of various UV-visible spectrophotometers at 1 nm intervals in the 380 to 780 nm spectrum. As noted above, the object of this invention is to obtain a matte, gloss-free ball appearance. To this end, it is necessary to prepare a resin composition having a relatively intense fluorescent color and also a certain degree of transparency, the indicator for which is defined as a measured value for the visible light transmittance of the outermost layer that falls within the foregoing range.

Numerous dimples of one, two or more types may be formed on the surface of the outermost layer. The shapes, diameters, depths, number, surface occupancy and other characteristics of the dimples may be suitably selected.

The golf ball of the invention has a paint film which is formed of a urethane-based paint composition that contains delustering particles. The paint film layer must be capable of enduring the harsh conditions of golf ball use, and so the urethane paint used in this invention is preferably a two-part curable urethane paint, with the use of a non-yellowing urethane paint being especially preferred. Examples of delustering particles include silica particles, melamine particles and acrylic particles. The use of silica particles is especially preferred. When the delustering particles are silica particles, it is preferable for the silica to have a particle size of from 1.0 to 3.0 µm and a specific surface area, expressed as the BET specific surface area, of from 200 to 400 m$^2$/g. When the delustering particles have too large a specific surface area, the paint thickening effect becomes too high, which may make the paint more difficult to work with. On the other hand, when the specific surface area is too small, the delustering effect may decrease. These delustering particles have an average primary particle size of preferably from 1.0 to 3.0 µm. When the average particle size is too large, the delustering effect decreases. When it is too small, especially when it is smaller than the wavelength of visible light (0.3 to 0.7 µm), the delustering effect may be lost.

The content of delustering particles may be set to preferably from 2 to 30 wt % per 100 wt % of the paint composition. When this content is too high, the ball surface may feel gritty and the paint film strength may decrease. When it is too low, a delustering effect may not be obtained.

Ball specifications such as the ball weight and diameter may be suitably set in accordance with the Rules of Golf.

EXAMPLES

The following Working Examples and Comparative Examples are provided to illustrate the invention, and are not intended to limit the scope thereof.

Working Examples 1 to 6, Comparative Examples 1 to 3

A resin composition was prepared for each of Working Examples 1 to 6 and Comparative Examples 1 to 3 according to the formulation shown in Table 1 below.

As shown in Table 1, the solid core in each Example was produced by using the following rubber composition, which is common to all the Examples, and vulcanizing for 15 minutes at 155° C.

TABLE 1

| Rubber composition for core (parts by weight) | A (common to all Examples) |
|---|---|
| Polybutadiene | 100 |
| Barium sulfate | 26.6 |
| Zinc oxide | 4 |
| Zinc stearate | 3 |
| 2,2-Methylenebis(4-methyl-6-tert-butylphenol) | 0.1 |
| Zinc salt of pentachlorothiophenol | 0.6 |
| Zinc acrylate | 23.5 |
| Dicumyl peroxide | 0.3 |
| 1,1-Di(tert-butylperoxy)cyclohexane | 0.3 |

Details on the above core materials are given below.

Polybutadiene: Available under the trade name "BR01" from JSR Corporation

Barium sulfate: Available from Sakai Chemical Co., Ltd.

Zinc oxide: Available from Sakai Chemical Co., Ltd.

Zinc stearate: Available from NOF Corporation 2,2-Methylenebis(4-methyl-6-tert-butylphenol): An antioxidant available under the trade name "Nocrac NS-6" from Ouchi Shinko Chemical Industry Co., Ltd.

Zinc acrylate: Available from Nippon Shokubai Co., Ltd.

Dicumyl peroxide: An organic peroxide available under the trade name "Percumyl D" from NOF Corporation 1,1-Di(tert-butylperoxy)cyclohexane:

An organic peroxide available under the trade name "Perhexa C-40" from NOF Corporation Formation of Cover Layers (Intermediate Layer and Outermost Layer)

Next, an intermediate layer-encased sphere having a diameter of 40 mm was produced by injection molding the intermediate layer-forming resin material shown in Table 2 below, which is common to all the Examples, to a thickness of 1.35 mm over the 37.3 mm diameter core obtained as described above.

TABLE 2

| Intermediate layer-forming resin material (parts by weight) | B |
|---|---|
| HPF 2000 | 100 |
| White pigment | 2.66 |

Details on the materials in the table are given below.
HPF 2000: An ionomer resin material available from E.I. DuPont de Nemours and Company
White pigment: Titanium dioxide Next, a three-piece golf ball having a ball diameter of 42.7 mm was manufactured by injection-molding the outermost layer-forming material (cover material) shown in Table 3 below to a thickness of 1.35 mm over the intermediate layer-encased sphere. A common dimple configuration was formed at this time on the surface of the outermost layer in each Working Example and Comparative Example.

TABLE 3

| | Outermost layer (pbw) | C | D | E | F | G | H | I | J | K |
|---|---|---|---|---|---|---|---|---|---|---|
| (A) | Himilan 1605 | 70 | 70 | 70 | 70 | 70 | 70 | 70 | 70 | 70 |
| | Surlyn 9320 | 30 | 30 | 30 | 30 | 30 | 30 | 30 | 30 | 30 |
| (B) | Light-harvesting fluorescent dye (1) | | | | | | 0.060 | | | |
| | Light-harvesting fluorescent dye (2) | | | | | | | 0.060 | | |
| | Light-harvesting fluorescent dye (3) | 0.012 | 0.031 | 0.001 | 0.065 | 0.017 | | | 0.026 | 0.012 |
| | Fluorescent dye | | | 0.072 | | | | | | |
| (C) | Inorganic filler (titanium dioxide) | 0.038 | 0.025 | 0.035 | | 0.044 | | | 0.160 | 0.073 |
| Other | Fluorescent brightener | | | | | 0.093 | | | | |
| | Magnesium stearate | 0.9 | 0.9 | 0.8 | 0.9 | 0.2 | 0.9 | | 0.4 | 0.2 |
| | Lubricant | | | 0.03 | | | | | | |

Details on the outermost layer-forming materials in Table 3 are given below.

Himilan 1605: An ionomeric resin available from DuPont-Mitsui Polychemicals Co., Ltd.
Surlyn 9320: An ionomeric resin available from E.I. DuPont de Nemours and Company
Light-harvesting fluorescent dye (1): Available under the trade name "Smart Color LP Yellow" from Kashinomoto Technologies Co., Ltd.
Light-harvesting fluorescent dye (2): Available under the trade name "Smart Color LP Pink" from Kashinomoto Technologies Co., Ltd.
Light-harvesting fluorescent dye (3): Available under the trade name "Lumicolor Red" from Kashinomoto Technologies Co., Ltd.
Fluorescent dye: Available under the trade name "Sumiplast Yellow FL7G" from Sumika Chemtex Co., Ltd.
Fluorescent brightener: Available under the trade name "Hakkol PY1800" from Showa Chemical Industry Co., Ltd.
Lubricant: Available under the trade name "Sanwax 161-P" from Sanyo Chemical Industries, Ltd.

Next, using the two-part curable urethane paint made of a base resin and a curing agent shown in Table 4 below, the surface of the outermost layer was coated to a thickness of 15 μm.

TABLE 4

| Resin composition of paint (pbw) | | M |
|---|---|---|
| Base resin | Saturated polyester polyol (m.w., 28,000) | 27.5 |
| | Delustering particles (silica) | 9 |
| | Solvent | 72.5 |
| Curing agent | HDI isocyanurate (low-molecular weight) | 42 |
| | Solvent | 58 |

Details on the base resin and curing agent are given in (i) to (iv) below.

(i) First, a reactor equipped with a reflux condenser, a dropping funnel, a gas inlet and a thermometer was charged with 140 parts by weight of trimethylolpropane, 95 parts by weight of ethylene glycol, 157 parts by weight of adipic acid and 58 parts by weight of 1,4-cyclo-hexanedimethanol, following which the temperature was raised to between 200 and 240° C. under stirring and the reaction was effected by 5 hours of heating. This yielded the saturated polyester polyol having an acid value of 4, a hydroxyl value of 170 and a weight-average molecular weight (Mw) of 28,000.

(ii) Next, the polyester polyol synthesized above was dissolved in butyl acetate, thereby preparing a varnish having a nonvolatiles content of 70 wt %.

(iii) The base resin was prepared by dissolving 27.5 parts by weight of the saturated polyester polyol solution with the butyl acetate (the nonvolatiles content of this solution was 27.5 wt %), and mixing in silica ("Finesil X-35" available from Maruo Calcium Co., Ltd.; average primary particle size, 2.4 μm; BET specific surface area, 262 m²/g) as the delustering particles.

(iv) Next, the isocyanate shown in Table 4 was dissolved in an organic solvent and used as the curing agent. That is, HDI isocyanurate (available as Duranate™ TPA-100 from Asahi Kasei Corporation; NCO content, 23.1 wt %; nonvolatiles content, 100 wt %) and, as the organic solvents, ethyl acetate and butyl acetate were added in the proportions shown in Table 4, thereby preparing a resin composition for use as a paint.

Table 5 shows the materials in the various layers of the golf balls obtained in the respective Working Examples and Comparative Examples, and also the diameters, compressive deformations and other properties of the balls. The transmittance of the cover (outermost layer) and the arithmetic mean roughness (Ra) of the paint film are also shown in the same table. In addition, two appearance evaluations were carried out by the methods described below on the golf balls obtained in the Working Examples and the Comparative Examples. Those results are also presented in Table 5.

Compressive Deformation

The core, intermediate layer-encased sphere or ball was placed on a steel plate and the amount of deflection by each when compressed under a final load of 1,275 N (130 kgf) from an initial load of 98 N (10 kgf) was measured. In each case, the amount of deflection was a measured value obtained after temperature conditioning at 23.9° C.

Cover Transmittance

The outermost layer-forming resin composition was molded into a 2 mm sheet and, with this as the sample, the visible light transmittance was determined using the UV-1800 ultraviolet-visible spectrophotometer from Shimadzu Corporation. Table 5 shows the average values of measurements taken at 1 nm intervals in the 380 to 780 nm spectrum.

Appearance 1

The visibility of the dimples on the golf balls obtained in each Example was visually evaluated and numerically rated according to the criteria shown below. The resulting scores are shown in Table 5. A higher score indicates a better result. Scores of 2 or less were regarded as unacceptable.

Rating Criteria 4 points: Dimple edges indicating dimple contours are substantially invisible. Vertical intervals between base and edge of individual dimples are substantially invisible.

3 points: Dimple edges indicating dimple contours are blurred but visible. Vertical intervals between base and edge of individual dimples are blurred but visible.

2 points: Dimple edges indicating dimple contours are somewhat distinctly visible. Vertical intervals between base and edge of individual dimples are somewhat distinctly visible.

1 point: Dimple edges indicating dimple contours are distinctly visible. Vertical intervals between base and edge of individual dimples are distinctly visible.

Appearance 2

The visibility of injection marks that form in gate areas on the cover (gate marks) during injection molding of the outermost layer of the cover was rated according to the criteria shown below. A higher score indicates a better result. Scores of 1 or less were regarded as unacceptable.

Rating Criteria 4 points: No visible flow marks.

3 points: Flow marks with inside diameter of about 3 mm are visible.

2 points: Flow marks with inside diameter of about 6 mm are visible.

1 point: Flow marks with inside diameter of about 10 mm are visible.

TABLE 5

| | | Working Example | | | | | | Comparative Example | | |
|---|---|---|---|---|---|---|---|---|---|---|
| | | 1 | 2 | 3 | 4 | 5 | 6 | 1 | 2 | 3 |
| Core | Material | A | A | A | A | A | A | A | A | A |
| | Diameter (mm) | 37.3 | 37.3 | 37.3 | 37.3 | 37.3 | 37.3 | 37.3 | 37.3 | 37.3 |
| | Weight (g) | 32.6 | 32.6 | 32.6 | 32.6 | 32.6 | 32.6 | 32.6 | 32.6 | 32.6 |
| | Compressive deformation (mm) | 4.3 | 4.3 | 4.3 | 4.3 | 4.3 | 4.3 | 4.3 | 4.3 | 4.3 |
| Intermediate layer | Material | B | B | B | B | B | B | B | B | B |
| | Diameter (mm) | 40 | 40 | 40 | 40 | 40 | 40 | 40 | 40 | 40 |
| | Weight (g) | 38.8 | 38.8 | 38.8 | 38.8 | 38.8 | 38.8 | 38.8 | 38.8 | 38.8 |
| | Compressive deformation (mm) | 4.1 | 4.1 | 4.1 | 4.1 | 4.1 | 4.1 | 4.1 | 4.1 | 4.1 |
| Cover | Material | C | D | E | F | G | H | I | J | K |
| | Diameter (mm) | 42.7 | 42.7 | 42.7 | 42.7 | 42.7 | 42.7 | 42.7 | 42.7 | 42.7 |
| | Weight (g) | 45.3 | 45.3 | 45.3 | 45.3 | 45.3 | 45.3 | 45.3 | 45.3 | 45.3 |
| | Compressive deformation (mm) | 3.7 | 3.7 | 3.7 | 3.7 | 3.7 | 3.7 | 3.7 | 3.7 | 3.7 |
| Paint film | Thickness (μm) | 15 | 15 | 15 | 15 | 15 | 15 | 15 | 15 | 15 |
| | Arithmetic mean roughness Ra | 0.54 | 0.54 | 0.54 | 0.54 | 0.54 | 0.54 | 0.54 | 0.54 | 0.54 |
| Cover transmittance (380 to 780 nm) | | 4.7 | 15.3 | 7.2 | 35.0 | 3.5 | 45.9 | 50.3 | 0.4 | 1.5 |
| Appearance 1 | Dimple visibility | 4 | 4 | 4 | 3 | 4 | 4 | 4 | 1 | 2 |
| Appearance 2 | Visibility of injection marks that form during molding of outermost layer | 3 | 3 | 3 | 3 | 3 | 2 | 1 | 4 | 4 |

The results in Table 5 show that all of the golf balls obtained in Working Examples 1 to 6 according to the invention had a good overall ball appearance; that is, the balls had a matte look that made it seem as if there were no dimples and the injection marks that form during molding of the outermost layer also were invisible.

By contrast, in Comparative Example 1, the outermost layer of the ball had a high transmittance, as a result of which injection marks were conspicuous and the ball appearance was poor.

In Comparative Example 2, the transmittance of the outermost layer of the ball was low. As a result, the dimple lands and boundaries were distinctly visible and the finished ball was not matte.

In Comparative Example 3, the transmittance of the outermost layer of the ball was low. As a result, the dimple lands and boundaries were somewhat distinctly visible and the ball could not be regarded as sufficiently matte.

Japanese Patent Application No. 2018-118518 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A golf ball comprising a core of at least one layer, a cover of at least one layer and a paint film, wherein an outermost layer of the cover is formed of a resin composition comprising
   (A) a thermoplastic resin, and
   (B) a colorant comprising a fluorescent dye or a fluorescent pigment
   and has a visible light transmittance with an average value at wavelengths in the 380 to 780 nm spectrum of from 2.0 to 50.0%, and the paint film is formed of a urethane-based paint composition containing silica as delustering particles, and wherein the colorant serving as component (B) is light harvesting and the silica serving as the delustering particles has an average primary particle size of from 1.0 to 3.0 μm and a BET specific surface area of from 262 to 400 m$^2$/g.

2. The golf ball of claim 1, wherein the thermoplastic resin of component (A) includes either of the following components (a) and (b):
   (a) an ethylene-α,β-unsaturated carboxylic acid copolymer or a metal salt thereof or both,
   (b) an ethylene-α,β-unsaturated carboxylic acid-α,β-unsaturated carboxylic acid ester copolymer or a metal salt thereof or both.

3. The golf ball of claim 1, wherein the content of component (B) is from 0.001 to 0.2 part by weight per 100 parts by weight of component (A).

4. The golf ball of claim 1, wherein the resin composition of the outermost layer further comprises:
   (C) an inorganic filler or organic filler in an amount of from 0.01 to 1.0 part by weight per 100 parts by weight of component (A).

5. The golf ball of claim 1, wherein the outermost layer has a transmittance of from 4 to 45%.

6. The golf ball of claim 1, wherein the outermost layer has a transmittance of from 10 to 40%.

* * * * *